O. MILLER.
VALVE MECHANISM FOR EXPLOSIVE ENGINES.
APPLICATION FILED MAR. 26, 1913.
1,085,462.
Patented Jan. 27, 1914.
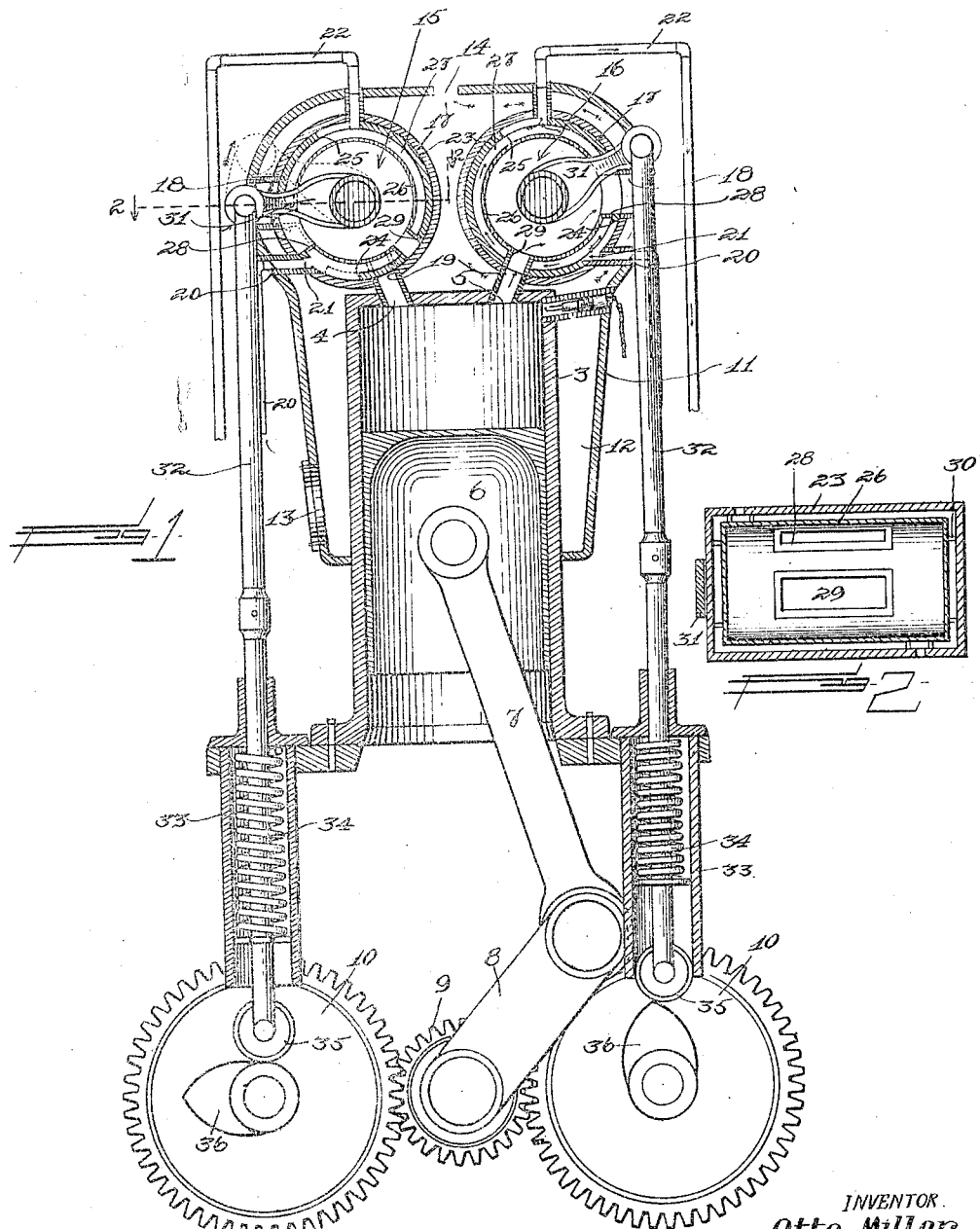
INVENTOR
Otto Miller
PER C. L. Parker
ATTORNEY.

UNITED STATES PATENT OFFICE.

OTTO MILLER, OF GLENELLYN, ILLINOIS.

VALVE-MECHANISM FOR EXPLOSIVE-ENGINES.

1,085,462.  Specification of Letters Patent.  Patented Jan. 27, 1914.

Application filed March 26, 1913. Serial No. 756,998.

*To all whom it may concern:*

Be it known that I, OTTO MILLER, a citizen of the United States, residing at Glenellyn, in the county of Dupage and State of Illinois, have invented certain new and useful Improvements in Valve Mechanism for Explosive-Engines, of which the following is a specification.

My invention relates to valve mechanisms for use in connection with internal combustion engines, for controlling the inlet or exhaust of gases into or out of the cylinders of the same and has particular reference to mechanisms of this character embodying a hollow cylindrical double walled rocker valve which is maintained properly cooled by the continuous circulation of oil between the inner and outer walls thereof, such oil also serving to thoroughly lubricate the different working parts of the mechanism.

An important object of this invention is to provide mechanism of the above mentioned character, which is simple in construction, cheap to manufacture, strong and durable.
Other objects and advantages of this invention will be apparent during the course of the following description.

In the accompanying drawings, forming a part of this specification, and in which like numerals are employed to designate like parts throughout the same, Figure 1 is a central vertical sectional view through the valve mechanism and engine to which the same is applied, and, Fig. 2 is a sectional view taken on line 2—2 of Fig. 1.

In the drawings, wherein is illustrated a preferred embodiment of my invention, the numeral 3 designates a cylinder, provided at its upper end with gas pipes or ports 4 and 5. Mounted to reciprocate within the cylinder 3 is a piston 6, pivotally connected with a pitman 7. This pitman is connected with a crank 8 driving a pinion 9 which in turn drives pinions 10.

Surrounding the upper portion of the cylinder 3 is a jacket 11, forming a water space 12, as shown. The water is preferably introduced into the lower end of the jacket 12 at an opening 13 and discharge from the upper end thereof through an opening 14. Suitably mounted within the upper portion of the jacket 12 are inlet and exhaust valve mechanisms 15 and 16. As these valve mechanisms are identical, it is thought that a description of one will suffice. The valve mechanism 15 comprises an outer cylindrical horizontal stationary shell or casing 17, provided with an outer pipe or port 18 and an inner port or opening 19 for receiving the gas pipe 4, as shown. An oil supply pipe 20 leads into the lower portion of the stationary casing 17 as shown at 21, such oil discharging from the upper portion of the stationary casing 17 through an outlet oil pipe 22. A pump, (not shown) which may be preferably located within the crank case, is employed to continuously circulate the oil through the pipes 20 and 22. Disposed within the outer stationary shell 17 is a cylindrical outer valve casing 23 adapted to turn or rock therein. This outer valve casing 23 is provided with relatively large openings or ports 24 and 25, which maintain the oil pipes 20 and 22 permanently uncovered to permit of the continuous flow of the oil into and out of the outer casing 17, while the valve mechanism is operating. Disposed within the outer valve casing 23 is an inner valve casing 26, which is smaller in diameter and concentrically arranged with relation thereto, for providing an annular oil circulating chamber 27, as shown. The inner valve casing 26 is provided with an outer gas pipe or port 28, passing through an opening in the outer valve casing 23, and adapted for movement into and out of registration with the outer pipe or port 18. The inner valve casing 26 is further provided with an inner gas pipe 29, passing through an opening in the outer valve casing 23 and adapted to be moved into and out of registration with the cylinder pipe 4. The pipes 28 and 29 serve to rigidly connect the inner valve casing 26 with the outer valve casing 23 to retain the same suitably spaced therefrom. Other spacing means may be employed if necessary. As more clearly shown in Fig. 2, the ends of the inner valve casing 26 carry spacing elements 30, which engage the ends of the outer valve casing 23. It is thus seen that I provide a double walled hollow valve, for controlling the inlet of the gases into the cylinder 3, such double walled hollow valve being provided in its outer wall with relatively large oil openings, whereby the oil is continuously circulated through the annular oil circulating chamber of the same, thus keeping the different parts of the valve properly cooled, and lubricated. The outer valve casing 23 is provided upon its outer surface with grooves (not shown) whereby the oil engaging the inner surface of the stationary casing 17 may more readily pass between the same and the outer valve casing 23.

Connected with each of the outer valve casings 23 is a crank 31, which turns or rocks the same. This crank has pivotal connection with a reciprocatory rod 32, operating through a stationary housing 33. The reciprocatory rod 32 is formed of two hinged sections, so that it will not bind, due to the swinging movement of the crank 31. The rod 32 is forced downwardly by a compressible coil spring 34, and carries at its lower end a roller 35, which is engaged by a cam 36, rigidly connected with the gear wheel 10.

The operation of the valve mechanism 15 is as follows: The oil is supplied through the inlet pipe 20, passes into the oil circulating chamber, and discharges through the outlet pipe 22. This oil cools the double walled hollow valve and also lubricates the engaging surface of the casings 17 and 23. The ports 24 and 25 permanently maintain the pipes 20 and 22 uncovered, whereby the circulation of the oil through the chamber 27 is continuous. The gas passes through the pipe 18, through pipe 28, into the inner valve casing 26, through pipe 29, and pipe 4 into the cylinder 3.

The operation of the exhaust valve mechanism 16 is as follows: The gases pass from the cylinder 3, through pipe 4, pipe 29, the inner valve casing 26, pipe 28, pipe 18 to the atmosphere. The lubrication is the same as described in connection with the valve mechanism 15.

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having described my invention, I claim:—

1. The combination with the cylinder of an internal combustion engine provided with a gas port, of valve mechanism for controlling the passage of gas through the gas port, comprising an outer stationary casing provided with lateral gas ports and oil ports, lateral oil pipes leading into the oil ports of the stationary outer casing, an outer valve casing mounted to rock within the outer stationary casing and provided in its periphery with relatively large lateral oil openings which remain in permanent registration with the oil ports of the stationary outer casing during the movement of the outer valve casing, whereby portions of the inner wall of the relatively stationary casing are exposed to the action of the oil, an inner valve casing disposed within the outer valve casing and being formed of a smaller diameter to provide an annular oil chamber through which the oil is continuously circulating, gas conduits connected with the inner valve casing and passing through the outer valve casing to be moved into and out of registration with the gas ports of the outer stationary casing, and means to turn the outer valve casing.

2. A valve mechanism for internal combustion engines, comprising a cylindrical relatively stationary outer casing provided in its periphery with lateral oil inlet and outlet means for maintaining a constant circulation of oil therethrough, a double walled cylindrical valve mounted to rock within the relatively stationary outer casing, comprising outer and inner spaced valve casings for providing an approximately annular oil circulating chamber, the outer valve casing being provided in its periphery with relatively large lateral oil ports maintained permanently in registration with the oil inlet and outlet means during the movement of the double walled valve, and exposing portions of the inner wall of the stationary outer casing to the action of the oil in the oil circulating chamber, the inner valve casing being provided with gas passage means having no communication with the approximately annular oil circulating chamber and adapted to be moved into and out of registration with gas ports formed through the relatively stationary outer casing, and means to rock the double walled valve.

In testimony whereof I affix my signature in presence of two witnesses.

OTTO MILLER.

Witnesses:
ROBT. J. SCOTT,
ELMER F. ADAMS.